United States Patent Office 2,795,561
Patented June 11, 1957

2,795,561

HYDROGENATION OF CARBON MONOXIDE OVER A MOLYBDENUM(III) OXYPHOSPHATE CATALYST TO NORMALLY SOLID, ESSENTIALLY HYDROCARBON POLYMERS

Joseph H Balthis, Jr., Mendenhall, Pa., assignor to E. I. du Pont de Nemours and Company, Wilmington, Del., a corporation of Delaware No Drawing. Application February 4, 1955, Serial No. 486,267

10 Claims. (Cl. 260—2)

This invention relates to catalytic processes and more particularly to a catalytic process for hydrogenating carbon monoxide to normally solid, essentially hydrocarbon polymers.

It has been known for many years that molybdenum sulfide is an active desulfurization catalyst and for this purpose it is useful in petroleum technology. As a result of intensive research on the chemistry of molybdenum, H. R. Arnold and J. E. Carnahan synthesized a new class of molybdenum salts which correspond to metal salts of the hypothetical acids $H_2MoO_2$ and $H_2MoO_3$ (U. S. Patent 2,572,300, issued October 23, 1951). Farlow and Herrick discovered that these and certain other metal salts of molybdenum were active catalysts for hydrogenating carbon monoxide to solid, essentially hydrocarbon polymers (U. S. Patent 2,652,372, issued September 15, 1953).

In contrast to molybdenum, phosphorus either as the oxide or sulfide does not seem to be effective in promoting hydrogenation reactions. H. R. Arnold et al., in U. S. patent applications Ser. Nos. 368,487 and 368,488, filed July 16, 1953, describe new reduced phosphomolybdic acids and salts thereof which are active hydrogenation catalysts, especially for converting carbon monoxide to normally solid polymethylenes. However, these reduced phosphomolybdic acids and metal salts are prepared by a multi-step, time-consuming method which includes drying, calcination, and reduction. They are therefore expensive to prepare.

In my copending U. S. patent application Ser. No. 415,431, filed March 10, 1954, molybdenum(III) phosphate is disclosed and claimed as a new compound and also as a catalyst for hydrogenating carbon monoxide to solid, essentially hydrocarbon polymers. However, a greater yield of the solid, essentially hydrocarbon high molecular weight polymer than has been obtained with this molybdenum(III) phosphate catalyst is highly desirable.

It is an object of this invention to provide a novel catalytic process for hydrogenating carbon monoxide to normally solid, essentially hydrocarbon polymers. A further object is to provide a catalytic process for converting carbon monoxide and hydrogen to normally solid polymethylenes employing a catalyst which does not require time-consuming or relatively expensive methods of preparation. Another object of this invention is to provide a catalytic process for hydrogenating carbon monoxide to normally solid polymethylenes employing a relatively more active molybdenum-phosphorus catalyst. Other objects will appear hereinafter.

These and other objects of this invention are accomplished by the following process for preparing normally solid, essentially hydrocarbon polymers which comprises heating and reacting carbon monoxide with hydrogen in contact with a molybdenum(III) oxyphosphate catalyst. Molybdenum(III) oxyphosphate designates compounds of trivalent molybdenum, either hydrated or anhydrous, containing the MoO radical chemically combined with the phosphate radical according to the formula $(MoO)_aH_bPO_4$, where $a$ is 2 or 3 and $b$ is 0 or 1, with the sum of $a+b=3$, e. g., when $a$ is 2, $b$ is 1. In continuing investigations in the field of molybdenum-phosphorus compounds for more active and selective hydrogenation catalysts, particularly for hydrogenation of carbon monoxide to normally solid, essentially hydrocarbon polymers, molybdenum(III) oxyphosphate has been prepared and found to possess desired properties as a catalyst in a high degree.

In practicing one embodiment of this invention, a pressure reactor is charged with the molybdenum(III) oxyphosphate catalyst and the carbon monoxide to be hydrogenated, or with a carbon monoxide/hydrogen gas mixture of predetermined composition, and if desired, an inert reaction medium. The reactor is then pressured with hydrogen or with a carbon monoxide/hydrogen gas mixture of predetermined composition, and the reaction mixture is agitated and heated to between 100° and 450° C. The pressure within the reactor is maintained by periodic injections of hydrogen, or carbon monoxide/hydrogen mixed gas, to compensate for that which has been utilized in the reaction. After reaction is complete, as evidenced by cessation of pressure drop, the reactor is permitted to cool, opened, and the contents discharged and filtered, extracted, or centrifuged to remove the catalyst. The normally solid polymethylene reaction product can be isolated by extraction or other means known to those skilled in the art.

The examples which follow are submitted to illustrate and not to limit this invention.

Example I

A silver-lined pressure reactor was charged with 100 ml. of xylene, 7.88 g. of molybdenum(III) oxyphosphate, $(MoO)_3PO_4 \cdot 8H_2O$, prepared from $MoOCl \cdot 2.5H_2O$ and $Na_3PO_4$ as described hereinafter, and a gas mixture composed of 2 moles of hydrogen per mole of carbon monoxide. The mixture was heated at 275° C. under a mixed gas pressure of 1000 atmospheres. During a 14-hour reaction period, the gas absorption amounted to 400 atmospheres. At the completion of the run, the vessel was cooled, vented, and the contents discharged.

The solid reaction products and catalyst were collected, and the mixture extracted with refluxing benzene. The benzene extract was diluted with methanol to precipitate 1.00 g. of solid, essentially hydrocarbon polymer. The remaining solid and catalyst were further extracted with refluxing xylene. Dilution of the xylene extracts with methanol precipitated 5.48 g. of solid, essentially hydrocarbon polymer. The total hydrocarbon polymer obtained amounted to 6.48 g. Thus, 0.82 g. of polymer was produced per gram of catalyst or 16.2 g. of polymer was produced per 1000 atmospheres of mixed gas absorbed.

The above experiment was repeated, using 20.1 g. of the molybdenum(III) phosphate ($MoPO_4 \cdot 3H_2O$) disclosed and claimed in my copending U. S. patent application Ser. No. 415,431, filed March 10, 1954; the mixed gas absorption in 15 hours was 290 atmospheres; the benzene extracts yielded 0.96 g. of hydrocarbon polymer, and the xylene extracts gave 1.45 g. of hydrocarbon polymer for a total of 2.41 g. of polymer. Expressed in terms as above, this yield of essentially hydrocarbon polymer is only 0.12 g. of polymer per gram of catalyst and only 9.27 g. of polymer per 1000 atmospheres of mixed gas absorbed.

The above data show that molybdenum(III) oxyphosphate is clearly superior to molybdenum(III) phosphate as a catalyst for the hydrogenation of carbon monoxide to normally solid polymethylenes. Thus, the yield per unit weight of catalyst is nearly seven times greater with the oxyphosphate than it is with the phosphate. Calculated on the basis of 1000 atmospheres of mixed gas absorbed, the yield is about twice as great. This means that the molybdenum(III) oxyphosphate catalyst is more productive per unit weight and converts nearly twice as much of the mixed gas to the desired polymethylene.

The molybdenum(III) oxyphosphate used in the above example was prepared as follows:

A solution of $MoOCl \cdot 2.5H_2O$ (30.4 g., 0.158 mole) in about 65 cc. of water was added to a stirred solution of trisodium phosphate dodecahydrate, $Na_3PO_4 \cdot 12H_2O$ (22.02 g., 0.0579 mole, 10% excess) in 572 cc. of water. Light brown gelatinous material precipitated, the pH dropping from 11 to 4.3. The precipitate was washed with three 285 cc. portions of water and dried in vacuo at room temperature. The dried product weighed 29.5 g., was not pyrophoric, and analyzed as follows:

*Anal.*—Calc'd for $(MoO)_3PO_4 \cdot 8H_2O$: Mo, 50.06%; P, 5.39%. Found: Mo, 49.80%, 49.88%; P, 6.01%, 6.03%.

The water present in the molybdenum(III) oxyphosphate is indicated to be present as water of hydration and as such can be reduced or eliminated by heating in the conventional manner.

The surface area, measured by the B. E. T.* method, was 47.8 square meters per gram.

*Example II*

Example I was repeated using 5.11 g. of secondary molybdenum(III) oxyphosphate catalyst $$(MoO)_2HPO_4 \cdot 5H_2O$$

prepared from molybdenum(III) oxychloride and disodium phosphate as described hereinafter. In 16 hours, mixed gas absorption amounted to 255 atmospheres. The benzene-soluble portion of the solid reaction product weighed 0.28 g. and the xylene-soluble portion weighed 3.35 g., giving a total of 3.63 g. of solid, essentially hydrocarbon polymer. This is equivalent to 0.71 g. of polymer per gram of catalyst and 14.2 g. of polymer per 1000 atmospheres of mixed gas absorbed.

The molybdenum(III) oxyphosphate used in the above example was prepared as follows:

$$2MoOCl + Na_2HPO_4 \rightarrow (MoO)_2HPO_4 + 2NaCl$$

Working in the absence of air, a solution of $$MoOCl \cdot 2.9H_2O$$

(67.8 g., 0.34 mole) in water (300 cc.) was added dropwise with stirring to a solution of disodium hydrogen orthophosphate 7-hydrate (50.1 g., 0.187 mole) in water (130 cc.). A gray-brown precipitate formed, and the pH of the slurry was 3.5. The precipitate was washed with water until virtually free of chlorine and dried by evacuation at room temperature. It weighed 67.7 g. and corresponded in composition to secondary molybdenyl phosphate 5-hydrate, $(MoO)_2HPO_4 \cdot 5H_2O$, a molybdenum(III) oxyphosphate.

|  | Calc'd | Found |
|---|---|---|
| Percent Mo | 46.81 | 47.06 |
| Percent P | 7.55 | 7.49 |
| Percent Na | 0.00 | 0.83 |
| Mo valence | 3.00 | 3.18 |

According to the present invention, carbon monoxide is reacted with hydrogen in the presence of molydenum-(III) oxyphosphate to give water and high molecular weight hydrocarbons. More particularly this invention comprises an improved hydrogenation of carbon monoxide to obtain a large yield of normally solid polymethylenes per unit weight of catalyst.

Although the molybdenum(III) oxyphosphate has been used unextended, if desired, it can be employed extended on such inert supports as charcoal, alumina, silica, and the like.

The particular physical form of the molybdenum(III) oxyphosphate for maximum activity depends upon the conditions under which the hydrogenation reaction is to be effected. Thus, for vapor or liquid phase continuous operation it is best to have the catalyst in the form of pellets, thus reducing mechanical losses. If the process is to be operated batch-wise, it is best that the catalyst be in finely divided form because in this way maximum activity is obtained.

The amount of catalyst used depends on the temperature and pressure, method of operation, time of contact, etc. In general, the amount of catalyst used is that required to bring about reaction at a suitable rate under the conditions used. Usually, in batch operation, the amount will vary from about 0.01% to 100% or more by weight of the carbon monoxide hydrogenated.

In continuous operation the amount of carbon monoxide hydrogenated at any given instant is ordinarily less than the weight of catalyst, but the total weight of carbon monoxide processed during the active life of the catalyst is much greater than the catalyst weight.

The hydrogenation of the carbon monoxide can be effected at pressures in excess of 50 atmospheres and preferably in excess of 100 atmospheres. Because pressures in excess of 1500 atmospheres offer no practical advantages from the yield standpoint or reaction rate increase, this represents the practical upper limit of pressure.

The use of a reaction medium is optional and whether such a medium is used is governed by such considerations as need to provide better than usual contact between reactants and catalyst, need for simplifying product recovery, need for exerting other beneficial effects upon an otherwise less efficient system, etc. Suitable reaction media include alcohols, e. g., isopropanol, etc., ethers, e. g., dioxane, diethyl ether, etc., hydrocarbons, e. g., cyclohexane, isooctane, and the like.

The process of this invention is particularly useful for converting carbon monoxide to high molecular weight solid polymethylenes. In this reaction temperatures of 100° to 450° C. may be used but since best results are obtained in the range of 150 to 350° C., this embraces the temperature conditions generally used.

The normally solid, essentially hydrocarbon polymers obtained by the novel catalytic process of this invention are convertible into useful films and fibers in the same manner as the essentially hydrocarbon polymers of Farlow and Herrick, U. S. Patent 2,652,372, dated September 15, 1953.

As many apparently widely different embodiments of this invention may be made without departing from the spirit and scope thereof, it is to be understood that this invention is not limited to the specific embodiments thereof except as defined in the appended claims.

I claim:

1. Process for the hydrogenation of carbon monoxide to normally solid, essentially hydrocarbon polymers which comprises heating and reacting carbon monoxide with hydrogen under pressure and in contact with a molybdenum(III) oxyphosphate catalyst having the formula $(MoO)_aH_bPO_4$ where $a$ is a cardinal number from 2 to 3 and $b$ is a cardinal number from 0 to 1 and the sum of $a+b=3$.

2. Process for the hydrogenation of carbon monoxide to normally solid, essentially hydrocarbon polymers which comprises heating and reacting carbon monoxide with hydrogen at a temperature of 100 to 450° C., under a pressure of at least 50 atmospheres, in contact with a

---

* A new method for measuring the surface areas of finely divided materials and for determining the size of particles, Am. Soc. for Testing Materials, March 4, 1941, Symposium on New Methods for Particle Size Determination in the Sub-Sieve Range.

molybdenum(III) oxyphosphate catalyst having the formula $(MoO)_aH_bPO_4$ where $a$ is a cardinal number from 2 to 3 and $b$ is a cardinal number from 0 to 1 and the sum of $a+b=3$.

3. Process for the hydrogenation of carbon monoxide to normally solid, essentially hydrocarbon polymers which comprises heating and reacting carbon monoxide with hydrogen at a temperature of 150 to 350° C., under a pressure of 50 to 1500 atmospheres, in contact with a molybdenum(III) oxyphosphate catalyst having the formula $(MoO)_aH_bPO_4$ where $a$ is a cardinal number from 2 to 3 and $b$ is a cardinal number from 0 to 1 and the sum of $a+b=3$.

4. Process for the hydrogenation of carbon monoxide to normally solid, essentially hydrocarbon polymers which comprises heating and reacting carbon monoxide with hydrogen at a temperature of 100 to 450° C., under a pressure of at least 50 atmospheres, in contact with a molybdenum(III) oxyphosphate catalyst having the formula $(MoO)_3PO_4 \cdot 8H_2O$.

5. Process for the hydrogenation of carbon monoxide to normally solid, essentially hydrocarbon polymers which comprises heating and reacting carbon monoxide with hydrogen at a temperature of 150 to 350° C., under a pressure of 100 to 1500 atmospheres, in contact with a molybdenum(III) oxyphosphate catalyst having the formula $(MoO)_3PO_4 \cdot 8H_2O$.

6. Process for the hydrogenation of carbon monoxide to normally solid, essentially hydrocarbon polymers which comprises heating and reacting carbon monoxide with hydrogen at a temperature of 100 to 450° C., under a pressure of at least 50 atmospheres, in contact with a molybdenum(III) oxyphosphate catalyst having the formula $(MoO)_2HPO_4 \cdot 5H_2O$.

7. Process for the hydrogenation of carbon monoxide to normally solid, essentially hydrocarbon polymers which comprises heating and reacting carbon monoxide with hydrogen at a temperature of 150 to 350° C., under a pressure of 100 to 1500 atmospheres, in contact with a molybdenum(III) oxyphosphate catalyst having the formula $(MoO)_2HPO_4 \cdot 5H_2O$.

8. Process for the hydrogenation of carbon monoxide to normally solid, essentially hydrocarbon polymers which comprises heating and reacting carbon monoxide with hydrogen in an inert reaction medium at a temperature of 100 to 450° C. under a pressure of at least 50 atmospheres and in contact with a molybdenum(III) oxyphosphate catalyst having the formula $(MoO)_aH_bPO_4$ where $a$ is a cardinal number from 2 to 3 and $b$ is a cardinal number from 0 to 1 and the sum of $a+b=3$.

9. Process for the hydrogenation of carbon monoxide to normally solid, essentially hydrocarbon polymers as set forth in claim 8 wherein said molybdenum(III) oxyphosphate catalyst has the formula $(MoO)_3PO_4 \cdot 8H_2O$.

10. Process for the hydrogenation of carbon monoxide to normally solid, essentially hydrocarbon polymers as set forth in claim 8 wherein said molybdenum(III) oxyphosphate catalyst has the formula $(MoO)_2HPO_4 \cdot 5H_2O$.

No references cited.